June 23, 1953
P. E. APPLEBY
2,642,921
APPARATUS FOR STITCHING TIRES
Filed Nov. 13, 1950
2 Sheets-Sheet 1
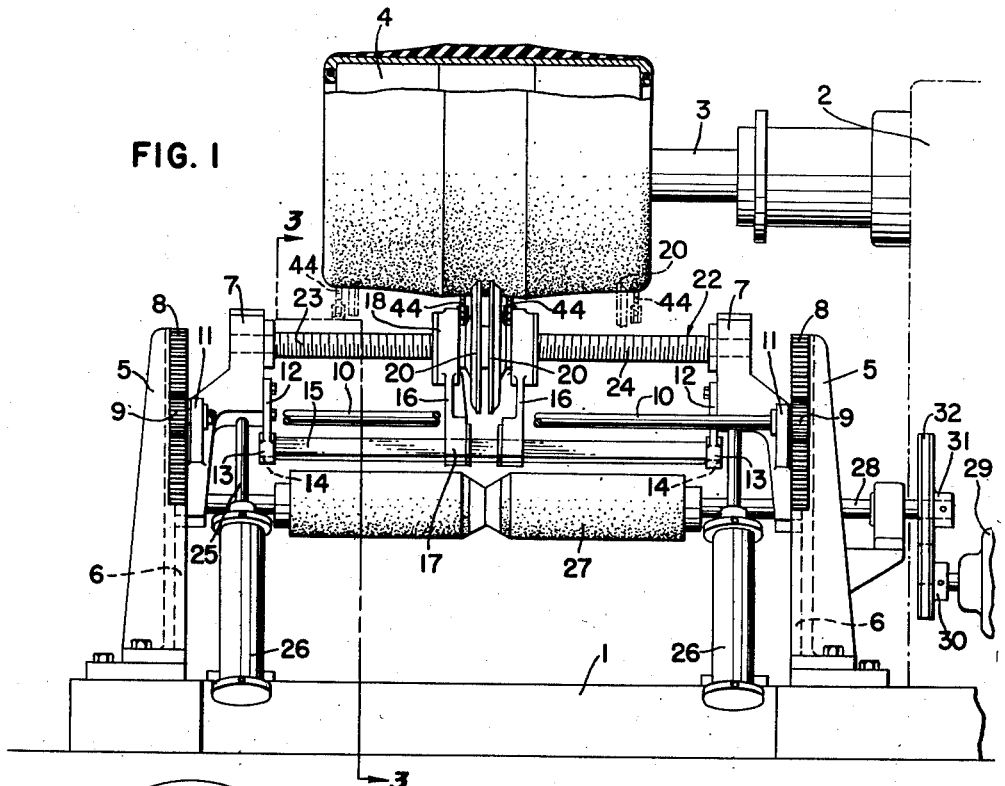
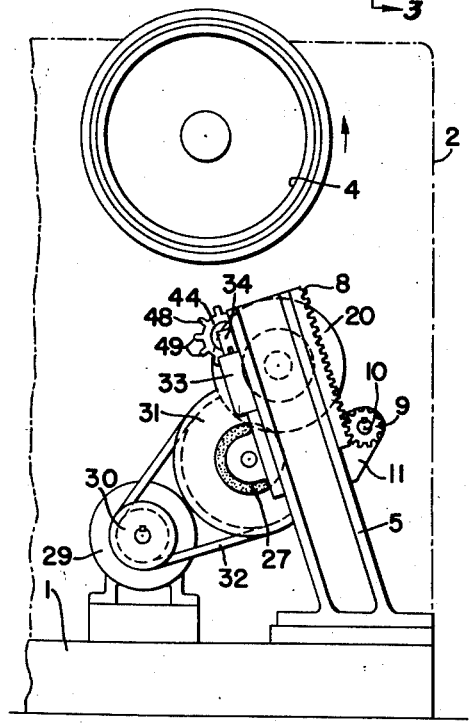
FIG. 2
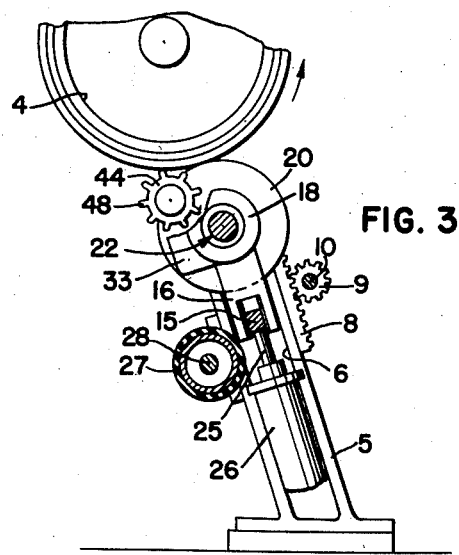
FIG. 3
INVENTOR.
PAUL E. APPLEBY
BY
R. L. Miller
ATTORNEY June 23, 1953     P. E. APPLEBY     2,642,921
APPARATUS FOR STITCHING TIRES Filed Nov. 13, 1950     2 Sheets-Sheet 2

INVENTOR.
PAUL E. APPLEBY
BY
*R. L. Miller*
ATTORNEY

Patented June 23, 1953

2,642,921

UNITED STATES PATENT OFFICE 2,642,921

APPARATUS FOR STITCHING TIRES

Paul E. Appleby, Akron, Ohio, assignor to Wingfoot Corporation, Akron, Ohio, a corporation of Delaware Application November 13, 1950, Serial No. 195,325

8 Claims. (Cl. 154—9)

This invention relates to tire building apparatus wherein revolving disks are employed to stitch the various elements of a pneumatic tire into an adhesively bonded unitary body.

Stitchers in the form of disks having smooth uninterrupted peripheries have been in general use and are well known. Stitchers of this type are satisfactory for stitching the fabric elements of a tire but the present practice of applying the tread and sidewall portions of a tire as a unit requires an auxiliary aid for stitching wheels of this type.

The tread and sidewall stocks are composed of unvulcanized rubber compound tubed in continuous strips, the tread portion forming the center portion and the sidewall portions joined to each side thereof. The strips are cut to the proper lengths and applied over the fabric tire carcass which has previously been built on a revolving collapsible drum in the usual manner.

The tread and sidewall assembled together and applied to a tire as a unit is generally referred to as the tread portion and will hereinafter be so designated.

The tread portion of a tire is the outer covering and the last element to be applied and is composed of unvulcanized stock in a semiplastic state which is subject to distortion by plain faced stitchers. The difficulty is that the soft material will be forced to pile up ahead of the stitchers both circumferentially and laterally as the tire building drum revolves and the stitchers move laterally from the center of the tread to the outer edges, causing wrinkles and displacement of the tread stock due to stretching or shifting which results in an uneven distribution of the tread material to such an extent that the finished tire is out of balance, causing noise and uneven wear when placed in use on an automobile.

Previous attempts have been made to eliminate the aforesaid undesirable features by the use of patter rolls of various types and design but their use requires another separate operation in the building of a tire and time is consumed in moving the apparatus into and out of position. Thus more time is required to build a tire.

An object of the present invention is to provide auxiliary star-wheels connected to and operating simultaneously with the regular disk stitchers to tack down the tread material at intermittent points in advance of the regular disk stitchers to prevent displacement, stretching or wrinkling of the material.

Another object is to save time by stitching the tread portion of a tire in a single operation with a saving of time and to eliminate the necessity of patter rolls and the like.

A further object is to provide a stitching mechanism that will assure a well balanced tire. When tires are out of balance caused by excess material at points about the circumference, the centrifugal action of unbalanced tires is reflected in the steering and riding qualities of an automobile upon which they are mounted, and driving becomes a hazard at high speed. Also, unbalanced tires wear rapidly and become out of round, causing noise in the form of thumping which is audible to passengers in a vehicle.

The aforesaid objects and other objects of the invention will become apparent as the description proceeds, and are accomplished by providing a stitching mechanism auxiliary to the regular stitchers comprising revolving disks having a plurality of projections or lugs spaced about the outer periphery. The auxiliary star-wheel stitchers are mounted on arms which support the disk stitchers and operate simultaneously therewith, the star-wheels being positioned to precede the disk stitchers across the face of the tread stock to adhesively tack or attach the tread to the fabric body of the tire at intermittent or spaced apart points to prevent displacement or shifting of the tread material when under rolling pressure of the revolving plain-faced conventional stitchers.

For a better understanding of the invention, reference should be had to the accompanying drawings wherein:

Figure 1 is an elevation of a portion of a tire machine showing the mounting of the stitchers as related thereto.

Figure 2 is a view showing the stitchers retracted from the tire building drum.

Figure 3 is a view taken on the line 3—3 of Figure 1 showing the stitchers in operative position.

Figure 4:
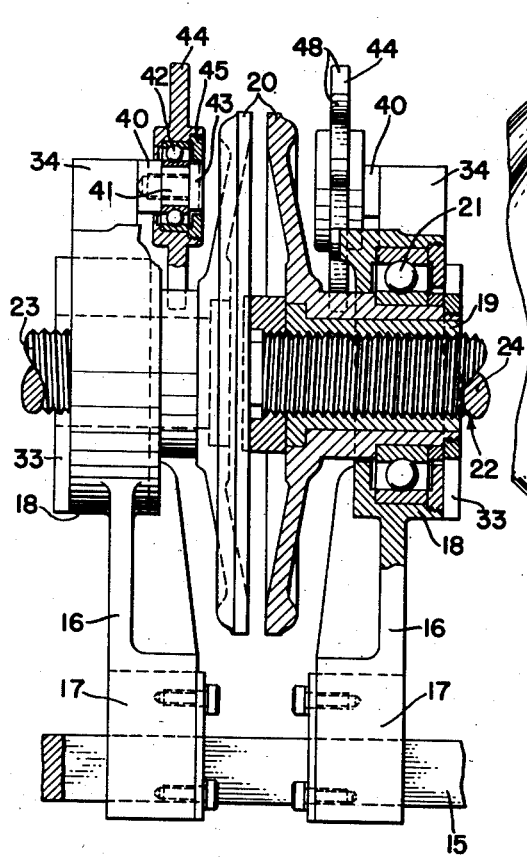
Figure 4 is an enlarged elevation of the stitchers.

Referring to the drawings, the numeral 1 designates a base plate upon which is mounted a tire machine housing 2 from which extends a shaft 3 having mounted thereon a tire building drum 4, the shaft 3 being driven by a motor not shown. Mounted on said base plate 1, pedestals 5 are provided with slideways 6 to receive sliding brackets 7 which are coordinated in their movement by racks 8 which are engaged by pinion gears 9 mounted on the ends of a shaft 10 which is supported in bearings 11 formed on the brackets 7. The pinion gears traverse the racks to keep the sliding brackets in alinement.

Mounted on the brackets 7 are arms 12 which terminate in bosses 13 to receive the cylindrical ends 14 of a square shaft 15. Stitcher arms 16 have formed on their lower ends bifurcated bosses 17 which engage the square shaft 15 in sliding relation for the purpose of keeping the stitcher arms in alinement when the stitchers are operated.

The stitcher arms 16 have formed at their upper ends, bosses 18 housing internally threaded sleeves 19 upon which are mounted stitcher disks 20 mounted in ball bearings 21. The internally threaded sleeves 19 engage a threaded shaft 22, said shaft being provided with righthand screw threads 23 on one side extending outwardly from the center, and lefthand screws 24 on the other side. The threaded shaft is provided with shouldered ends which are rigidly secured in bores provided in the brackets 7.

Attached to the bottom of the brackets 7 are piston rods 25 extending from fluid pressure cylinders 26 which, when pressure is applied to the lower ends thereof, raise the brackets 7 biasing the stitchers into pressed contact with the tire elements on the revolving drum 4 which causes the stitcher disks 20 mounted on the threaded sleeves 19 to revolve and move across the tire elements from the center to the outer edges. When the stitcher disks have reached their outermost position, pressure is relieved from the lower ends of the cylinder 26 and applied to the upper ends to retract the sliding brackets 7 which will lower the stitcher disks out of contact with the tire elements.

The fluid pressure cylinders are operated by solenoid valves which are connected to limit switches in a suitable timing arrangement (not shown) which will coordinate the movement of the stitchers with respect to the revolving drum, a feature well known in tire machines.

When the stitching disks are withdrawn from the tire elements, they rest upon a rubber-covered roller 27 mounted upon a shaft 28 and driven by the motor 29 through the pulleys 30 and 31 which are connected by a belt 32. The rubber-covered roller is revolved in the opposite direction than that of the tire building drum 4 to bring the stitcher disks back to a central position.

Figure 5:
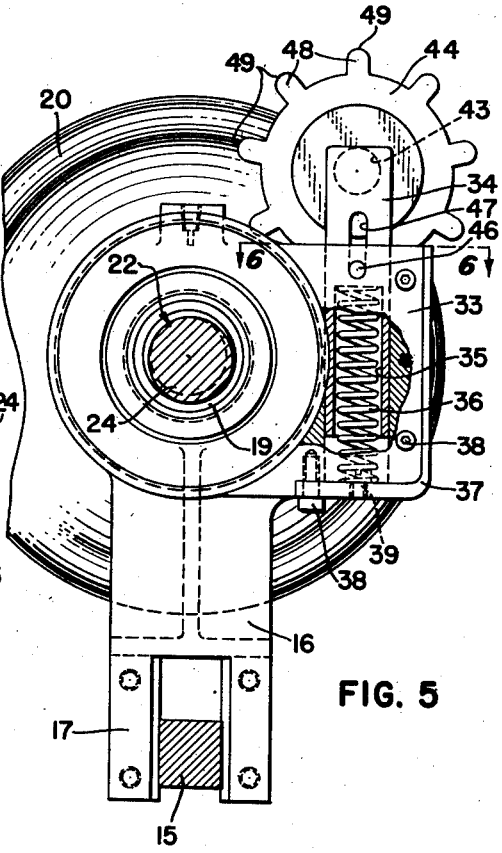
Figure 5 is an enlarged side view of the stitchers.
Figure 6:
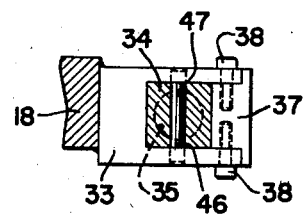
Figure 6 is a sectional view taken on the line 6—6 of Figure 5.

Extending from the bosses 18 of the stitcher arms 16, extensions 33 (see Figures 4, 5 and 6) are provided with bifurcations to receive plungers 34 provided with bores 35 to receive springs 36. The plungers are slidably secured in the bifurcations by angular offset plates 37 which enclose the ends and bottom of the bifurcations, the plates being attached to the bifurcated projections by machine screws 38. Round-head machine screws 39 are provided in the bottom portion of the plate 37 so that the heads extend into the springs to keep same in axial alinement with respect to the bores 35 in the plungers 34.

From the upper ends of the plungers 34 extensions 40 are provided with turned down portions 41 on which are mounted ball bearings 42 retained thereon by stud screws 43. Mounted on the ball bearings 42 are star-wheel stitchers 44 which are secured thereon by retainer nuts 45. The plungers bearing the star-wheel stitchers are limited in their sliding movement and retained in the bifurcations by pins 46 extending through the plungers and projecting into grooves 47 formed in the opposite walls of the bifurcated extensions 33.

The star-wheels 44 are composed of disks serrated or otherwise formed to provide a plurality of radially extending lugs or projections 48 on the outer periphery thereof. The lugs are rounded on their outer ends as at 49 so that they present an even rolling surface to the tire elements when the star-wheels are in spring-pressed revolving contact with the tire elements on the rotating drum.

In operation the fabric body of a tire is built upon the tire building drum in the usual manner and the tread portion applied thereto. The drum is revolved and through the action of the fluid pressure cylinders 26 the sliding brackets 7 move the stitcher disks 20 and the star-wheels 44 into operative contact with the tire elements on the drum 4.

As the slide raises, the star-wheels first contact the tire elements on the drum 4 and as the plungers on which they are mounted compress the springs 36, the regular disk stitchers 20 move into frictional engagement with the revolving tire elements which actuates the threaded sleeves on the right and lefthand threaded shaft 22 to move the regular stitching disks and the star-wheels in opposite directions from the center of the tire to the outer edges thereof. The pressure of the regular stitchers on the tire elements is exerted by the fluid pressure cylinders 26 and the star-wheels receive their pressure from the springs 36. Thus they are independently pressed against the tire elements. This is necessary to provide even pressure over the changing contour of the tire elements.

From the foregoing, the important function of the star-wheels of tacking down the tread and sidewall portions of a tire, at intermittent or spaced apart points in advance of the regular disk stitchers, will prevent flowing or shifting of the tacky semiplastic tread material under the continuous rolling pressure of the regular stitching disks, with the result that an even distribution of the tread material over the fabric carcass of tires will provide an even balanced tire which will greatly improve the safety and wearing qualities of tires, will eliminate noise in the form of thumping or tramping and improve the riding qualities of a vehicle on which they are mounted.

It will be understood that when the tread with the attached sidewalls is applied to the tire carcass the thinner sidewall portions are more apt to be stretched or more easily stretched than the center, heavier tread portion. While the looseness is not shown in the drawings, it is well understood by those skilled in the art that the fabric carcass, prior to applying the tread portion, is thicker at the center than at the edges so that even without stretching there is a looseness of the sidewall portions of the tread. As explained earlier, this means that if only the stitcher 20 engaged the sidewall portions and the sidewall portions were not tacked down evenly around the periphery of the carcass, the wrinkling that may occur would become considerable at one point and form a ridge. However, if the sidewall is first tacked down at spaced points about the periphery without pushing the material forward in a direction opposite to that of the rotating drum, then when the stitchers come along if there is any tendency to wrinkle because of the excess of material in the sidewalls, the wrinkling will be done at numerous spaced points about the tread which will prevent forming an unbalanced tire. However, in practice, with the star wheels provided as shown herein, the material is tacked down at so many places about the periphery without shoving the material forward that as the stitchers engage the sidewalls in their operating movement, little, if any, wrinkling occurs.

The initial position of the star wheels 44 is immaterial so long as they engage those portions of the material which tend to wrinkle. Normally the thicker center section of the tread portion is not subject to such action but the thinner edge portions are, and it has been found practical to position the star wheels so that at their initial positions they engage the tread portion at the point where that portion tapers off to form the sidewall rubber of the tire.

While certain representative embodiments and details have been shown for the purpose of illustrating the invention, it will be apparent to those skilled in this art that various changes and modifications may be made therein without departing from the spirit and scope of the invention.

I claim:

1. In a tire building machine, a revolving collapsible drum upon which the various elements of a tire are assembled into adhesive relationship; a stitching mechanism comprising a shaft, arms slidably mounted on said shaft, bosses formed on said arms, plain-faced stitcher wheels mounted in said bosses, bifurcated extensions formed on said bosses, spring actuated plungers slidably disposed in said bifurcations, slot and pin means to limit the motion of said plungers, star-wheels mounted on said plungers, said star-wheels being composed of disks having a plurality of projections extending from the outer periphery thereof, an angular plate for enclosing the spring actuated plungers in said bifurcated extensions; fluid pressure means for actuating said arms to simultaneously swing the plain-faced stitchers and the star-wheels into and out of contact with the tire elements on the drum, whereby said star-wheels are biased toward the drum independently of the biasing of the plain-faced stitcher wheel; and means for moving said stitchers and star-wheels across the tire elements from the center to the outer edges thereof and means to return said stitchers and star-wheels to a normal central position.

2. In a tire building machine, a revolving collapsible drum upon which the various elements of a tire are assembled into adhesive relationship, a stitching mechanism comprising a shaft, arms slidably mounted on said shaft, bosses formed on said arms, plain-faced stitcher wheels mounted in said bosses, bifurcated extensions formed on said bosses, spring actuated plungers slidably disposed in said bifurcations, slot and pin means to limit the motion of said plungers, star-wheels mounted on said plungers, said star-wheels being composed of disks having a plurality of projections extending from the outer periphery thereof and mounted so that they precede the plain-faced stitchers to tack down the tire elements at spaced points to prevent wrinkles and stretching in the tire elements when stitched by the plain-faced stitchers, said star-wheels and stitchers being biased on the drum under independent pressures.

3. In a tire building machine, a revolving collapsible drum upon which the various elements of a tire are assembled into adhesive relationship, a stitching mechanism comprising a rotatable shaft, at least one arm slidably mounted on said shaft, a boss formed on said arm, at least one plain-faced stitcher wheel mounted in said boss, bifurcated extensions formed on said boss, at least one spring actuated plunger having a bore to receive a compression spring slidably disposed in said bifurcated extensions, slot and pin means to limit the motion of said plunger and a star-wheel mounted on said plunger, said star-wheel being composed of a disk having a plurality of projections extending from the outer periphery thereof to tack down the tread material at spaced apart points in advance of the plain-faced stitchers, said plain-faced stitchers and star-wheels being biased toward the drum by independent pressures.

4. In a stitching mechanism for stitching the various elements of a tire into adhesive relationship, comprising a shaft, at least one arm slidably mounted on said shaft, a boss formed on said arm, a plain-faced stitcher wheel mounted in said boss, a bifurcated extension formed on said boss, a spring actuated plunger slidably disposed in said bifurcation, a star-wheel mounted on said plunger, said star-wheel being composed of a disk having a plurality of projections extending from the outer periphery thereof, an angular plate for enclosing the spring actuated plunger in said bifurcated extension, means for actuating said arm to simultaneously swing the plain-faced stitcher and the star-wheel into and out of contact with the tire elements, and means whereby the stitcher and star-wheel contact the tire elements under independent pressure.

5. The combination with a rotatable tire drum of stitching mechanism adapted to stitch tire carcass material together while on said drum, comprising a support mounted for bodily translation substantially parallel to the axis of rotation of said drum, a smooth-faced stitcher wheel mounted on said support, a tacking wheel also mounted on said support and having a working surface provided with peripherally spaced projections, said tacking wheel being spaced peripherally of said drum a substantial amount from said stitcher wheel in a position to engage the material on said drum at a point appreciably in advance of said stitcher wheel peripherally of the drum as the drum rotates to thereby tack the material together at spaced points in advance of the stitching by the stitching wheel, and means for imparting a movement of translation to the stitcher and tacking wheels laterally across the peripheral surface of said drum.

6. The combination with a rotatable tire drum of stitching mechanism adapted to stitch tire carcass material together while on said drum, comprising a support mounted for bodily translation substantially parallel to the axis of rotation of said drum, a smooth-faced stitcher wheel mounted on said support, a tacking wheel also mounted on said support and having a working surface provided with peripherally spaced projections, said tacking wheel being spaced peripherally of said drum a substantial amount from said stitcher wheel in a position to engage the material on said drum at a point appreciably in advance of said stitcher wheel peripherally of the drum as the drum rotates to thereby tack the material together at spaced points in advance of the stitching by the stitching wheel, said tacking wheel being also spaced axially of said drum from said stitching wheel in the direction of movement of said stitching and tacking wheels during the operative cycle thereof, and means for imparting a movement of translation to the stitcher and tacking wheels in a direction laterally across the peripheral surface of said drum such that during the operative cycle of movement the tacking wheel first tacks the material together and then the stitching wheel stitches the material into adhesive relationship.

7. The combination with a rotatable tire drum of stitching mechanism adapted to stitch tire carcass material together while on said drum, comprising a support mounted for bodily translation substantially parallel to the axis of rotation of said drum, a smooth-faced stitcher wheel mounted on said support, a tacking wheel also mounted on said support and having a working surface provided with peripherally spaced projections, said tacking wheel being spaced peripherally of said drum a substantial amount from said stitcher wheel in a position to engage the material on said drum at a point appreciably in advance of said stitcher wheel peripherally of the drum as the drum rotates to thereby tack the material together at spaced points in advance of the stitching by the stitching wheel, said tacking wheel being also spaced axially of said drum from said stitching wheel in the direction of movement of said stitching and tacking wheels during the operative cycle thereof, means mounting said stitching and tacking wheels for movement toward and from said drum, means for urging said stitching and tacking wheels against the material on said drum, and means for imparting a movement of translation to the stitcher and tacking wheels in a direction laterally across the peripheral surface of said drum, such that during the operative cycle of movement the tacking wheel first tacks the material together and then the stitching wheel stitches the material into adhesive relationship.

8. The combination with a rotatable tire drum of stitching mechanism adapted to stitch tire carcass material together while on said drum, comprising a support mounted for bodily translation substantially parallel to the axis of rotation of said drum, a smooth-faced stitcher wheel mounted on said support, a tacking wheel also mounted on said support and having a working surface provided with peripherally spaced projections, said tacking wheel being spaced peripherally of said drum a substantial amount from said stitcher wheel in a position to engage the material on said drum at a point appreciably in advance of said stitcher wheel peripherally of the drum as the drum rotates to thereby tack the material together at spaced points in advance of the stitching by the stitching wheel, said tacking wheel being also spaced axially of said drum from said stitching wheel in the direction of movement of said stitching and tacking wheels during the operative cycle thereof, means mounting said stitching and tacking wheels for movement toward and from said drum, means for urging said stitching and tacking wheels against the material on said drum, including yielding means for permitting relative movement between the tacking and stitching wheels in a direction toward the drum, and means for imparting a movement of translation to the stitcher and tacking wheels in a direction laterally across the peripheral surface of said drum, such that during the operative cycle of movement the tacking wheel first tacks the material together and then the stitching wheel stitches the material into adhesive relationship.

PAUL E. APPLEBY.

References Cited in the file of this patent

UNITED STATES PATENTS

| Number | Name | Date |
|---|---|---|
| 2,161,117 | Wikle | June 6, 1939 |
| 2,381,379 | Stevens | Aug. 7, 1945 |
| 2,406,093 | Miller | Aug. 20, 1946 |
| 2,464,020 | Breth | Mar. 8, 1949 |
| 2,490,445 | Kuffler | Dec. 6, 1949 |
| 2,541,648 | Haase | Feb. 13, 1951 |

FOREIGN PATENTS

| Number | Country | Date |
|---|---|---|
| 117,101 | Australia | June 8, 1943 |